US012693617B2

(12) United States Patent
Ogino

(10) Patent No.: US 12,693,617 B2
(45) Date of Patent: Jul. 28, 2026

(54) IMAGE FORMING APPARATUS AND METHOD FOR OPERATING IMAGE FORMING APPARATUS

(71) Applicant: SHARP KABUSHIKI KAISHA, Sakai City (JP)

(72) Inventor: Kumiko Ogino, Sakai City (JP)

(73) Assignee: SHARP KABUSHIKI KAISHA, Sakai City (JP)

(*) Notice: Subject to any disclaimer, the term of this patent is extended or adjusted under 35 U.S.C. 154(b) by 0 days.

(21) Appl. No.: 18/922,638

(22) Filed: Oct. 22, 2024

(65) Prior Publication Data

US 2025/0138462 A1 May 1, 2025

(30) Foreign Application Priority Data

Oct. 31, 2023 (JP) ................................ 2023-187012

(51) Int. Cl.
*G03G 15/20* (2006.01)
*G03G 15/00* (2006.01)

(52) U.S. Cl.
CPC ..... *G03G 15/5066* (2013.01); *G03G 15/2064* (2013.01); *G03G 15/5016* (2013.01); *G03G 15/5029* (2013.01)

(58) Field of Classification Search
CPC .. G03G 15/55; G03G 15/553; G03G 15/5016; G03G 15/2039; G03G 15/2042
See application file for complete search history.

(56) References Cited

U.S. PATENT DOCUMENTS

2013/0322900 A1* 12/2013 Ogawahara ........ G03G 15/5095 399/45
2025/0053125 A1* 2/2025 Kubota .............. G03G 15/5016
2025/0208558 A1* 6/2025 Ohsugi .............. G03G 15/5016

FOREIGN PATENT DOCUMENTS

JP 2017-003725 A 1/2017

* cited by examiner

*Primary Examiner* — Thomas S Giampaolo, II
(74) *Attorney, Agent, or Firm* — ScienBiziP, P.C.

(57) ABSTRACT

An image forming apparatus includes one or more controllers; and an image former having a detachable fixing unit, wherein the one or more controllers acquire fixing unit information on a fixing unit being attached to the image former, and execute a predetermined process, based on the acquired fixing unit information.

6 Claims, 16 Drawing Sheets

MACHINE ADJUSTMENT

MACHINE ADJUSTMENT

MACHINE ADJUSTMENT

MACHINE ADJUSTMENT

IMAGE FORMING APPARATUS AND METHOD FOR OPERATING IMAGE FORMING APPARATUS

CROSS-REFERENCE TO RELATED APPLICATION

The present application claims priority from Japanese Application JP2023-187012, the content of which is hereby incorporated by reference into this application.

BACKGROUND OF THE INVENTION

1. Field of the Invention

The present disclosure relates to an image forming apparatus and a method for operating the image forming apparatus.

2. Description of the Related Art

In general, as a printing system of an image forming apparatus, such as a printer or a multifunction peripheral, a dry electrophotographic system (laser printer system) has been used. In a laser printer system, an image is formed on a sheet by transferring toner, and then the image on the sheet is heated and pressurized, thereby fixing the image on the sheet. For this reason, an image forming apparatus that performs printing by the laser printer system includes a fixing unit (or a fuser) for heating and pressurizing an image on a sheet.

The fixing unit includes a fixing member that comes into contact with a sheet on which an image to be fixed is formed. The fixing member is, for example, a fixing belt. The fixing belt is disposed such that its longitudinal direction is orthogonal to a sheet transport direction. In the present application, a width of a sheet in a direction orthogonal to the sheet transport direction is referred to as a sheet width. For example, in a general multi function printer (MFP) having a scanner function, a sub scanning direction of a scanner coincides with the sheet transport direction, and a main scanning direction of the scanner is orthogonal to the sheet transport direction. Therefore, in a general MFP, a sheet width refers to a width of a sheet in a main scanning direction.

FIG. 15A is a diagram illustrating scratches generated on a fixing belt when an A5 sheet repeatedly passes. When an A5 sheet 301 repeatedly passes on a fixing belt 303, scratches 305 and 307 are generated on the fixing belt 303 at positions corresponding to a sheet width of the A5 sheet 301. It is assumed that, after these scratches are generated, an A3 sheet 309 larger than the A5 sheet repeatedly passes on the same fixing belt 303.

In this case, as illustrated in FIG. 15B, although scratches 311 and 313 are generated on the fixing belt 303 at positions corresponding to a sheet width of the A3 sheet 309, since the scratches 311 and 313 are located on a substantially outside of the A3 sheet 309, the scratches 311 and 313 do not affect print quality of the A3 sheet 309. However, the scratches 305 and 307 caused by the A5 sheet 301 fall within the sheet width of the A3 sheet 309, which adversely affects the print quality of the A3 sheet 309. To be specific, in the A3 sheet 309, stains 315 and 317 are generated at positions corresponding to the scratches 305 and 307 caused by the A5 sheet 301.

In order to avoid this problem, it has been considered to use and operate the fixing belt only for printing with a specific sheet width. Namely, as illustrated in FIG. 16A, the fixing belt 303 is used when the A5 sheet 301 is printed, whereas, as illustrated in FIG. 16B, another fixing belt 321 is used when the A3 sheet 309 is printed. Although the scratches 305 and 307 are generated on the fixing belt 303 by repetitive printing and the scratches 311 and 313 are generated on the fixing belt 321, since the fixing belts are prepared for respective sheet widths, it is possible to avoid that scratches generated by printing a sheet of another sheet width adversely affect print quality.

As described above, another operation method in which a fixing belt or a fixing unit is replaced is disclosed in the related art. Types of media that can pass are diversified, and it is necessary to finely adjust a fixing condition that determines final image quality, depending on a thickness and surface properties of the media, a density and glossiness of an image of a product to be acquired, and the like. As a countermeasure against these problems, it has been proposed in the related art that a dedicated fixing unit is prepared according to a size of a sheet that passes or a type of a medium and a user replaces the fixing unit as needed, whereby optimum image quality can be acquired.

In general, a fixing unit after operation reaches a high temperature, and therefore, when the fixing unit is replaced, it is required to perform replacement work in consideration of the high temperature. In this regard, in the related art, it has been proposed to notify a user of whether a temperature of a mounted fixing unit is lowered to a predetermined temperature or lower.

SUMMARY OF THE INVENTION

The replacement before operation of the fixing unit of the image forming apparatus is disclosed in, for example, the related art. However, an image forming apparatus that performs different operations for different fixing units is not disclosed. An object to be solved by an aspect of the present disclosure is to provide an image forming apparatus that performs different operations for different fixing units.

In order to solve the above problem, according to an aspect of the present disclosure, an image forming apparatus includes one or more controllers, and an image former having a detachable fixing unit. The one or more controllers acquire fixing unit information on a fixing unit being attached to the image former, and a predetermined process is executed based on the acquired fixing unit information.

Furthermore, according to another aspect of the present disclosure, a method for operating an image forming apparatus including an image former having a detachable fixing unit includes acquiring fixing unit information on a fixing unit being attached to the image former, and executing a predetermined process based on the acquired fixing unit information.

According to an aspect of the present disclosure, an image forming apparatus that performs different operations for different fixing units can be provided.

DETAILED DESCRIPTION OF THE INVENTION

1. First Embodiment

1.1 Functional Configuration of Image Forming Apparatus 1

Figure 1:
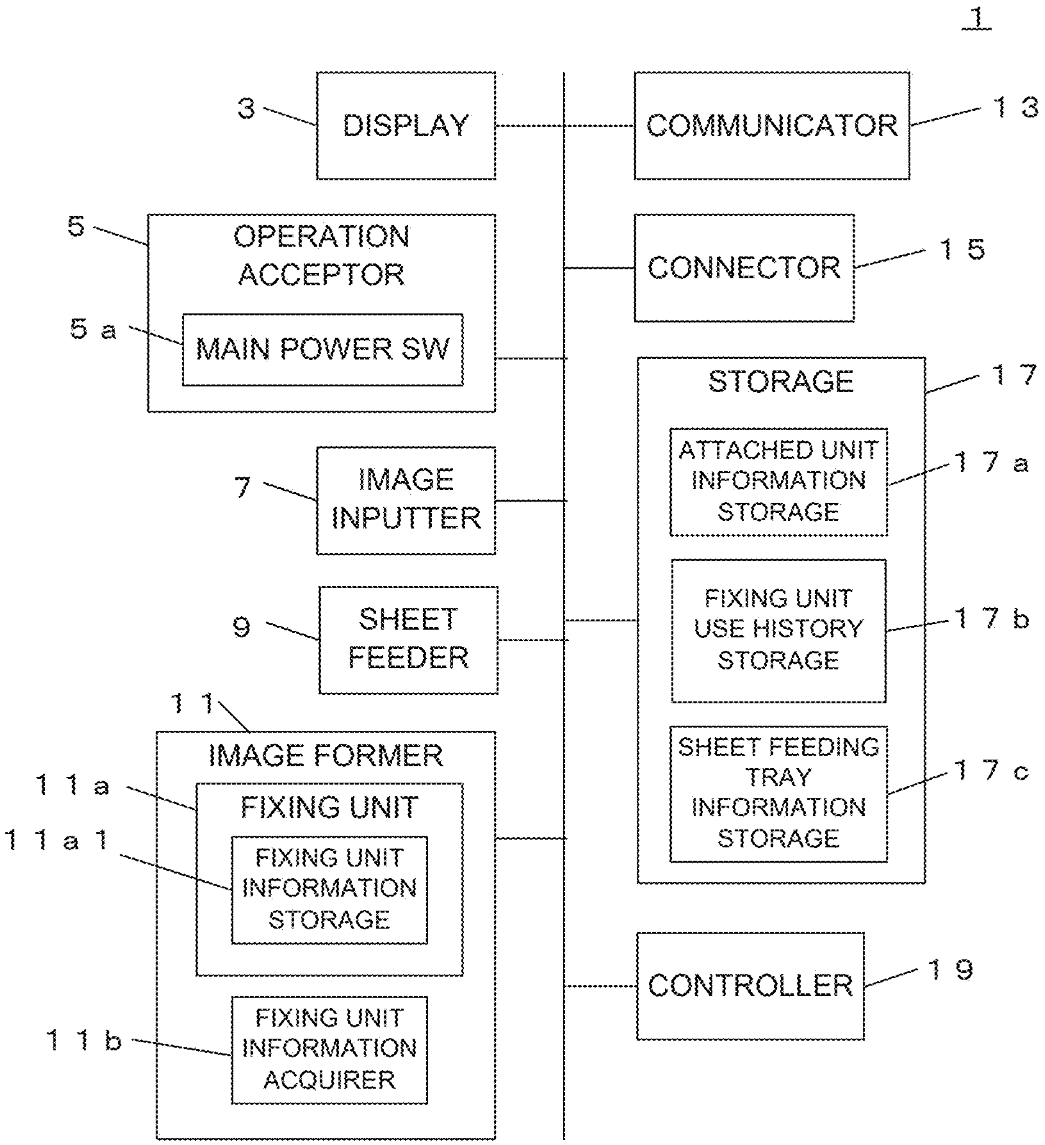
FIG. 1 is a functional block diagram of an image forming apparatus according to a first embodiment of the present disclosure.

FIG. 1 is a functional block diagram of an image forming apparatus 1 according to a first embodiment of the present disclosure. The image forming apparatus 1 is a multi-function printer/peripheral (MFP) or a multi-function machine, and typically has a copy function, an image scanner function, a facsimile function, and a printer function. The image forming apparatus 1 may further include other functions, such as an e-mail transmission/reception function and a file server function.

The image forming apparatus 1 includes a display 3, an operation acceptor 5, an image inputter 7, a sheet feeder 9, an image former 11, a communicator 13, a connector 15, a storage 17, and a controller 19. The operation acceptor 5 includes a main power switch (SW) 5*a*. The image former 11 includes a fixing unit 11*a* and a fixing unit information acquirer 11*b*. The fixing unit 11*a* includes a fixing unit information storage 11*a*1. The storage 17 includes an attached unit information storage 17*a*, a fixing unit use history storage 17*b*, and a sheet feeding tray information storage 17*c*.

The display 3 is a functional section for displaying images and text. For example, the display 3 is configured by a liquid crystal display (LCD), an organic electro-luminescence (EL) panel, or the like. The display 3 may be a single display device or may further include a display device externally connected.

The operation acceptor 5 accepts an operation input by a user. For example, the operation acceptor 5 includes hardware keys or software keys. Furthermore, the operation acceptor 5 includes, for example, a task key for instructing execution of a task, such as FAX transmission or image reading, and a stop key for instructing stop of an operation. Moreover, the operation acceptor 5 may include a physical operation key, such as a task key, a stop key, a power key, and a power saving key. The main power SW 5*a* is a switch for turning on and off the main power of the image forming apparatus 1.

The display 3 and the operation acceptor 5 may be integrally configured. For example, a touch panel display may be used as the display 3 and the operation acceptor 5. In this case, the main power SW 5*a* is preferably provided separately from the touch panel display.

The image inputter 7 reads an image (document) and outputs the image as image data. The image inputter 7 is configured by a general scanner (image input device). Furthermore, the image inputter 7 may input image data from an external storage medium, such as a USB memory, or may receive an image via a network. A main scanning direction of the image inputter 7 is orthogonal to a sheet transport direction of the sheet feeder 9, and a sub scanning direction of the image inputter 7 coincides with the sheet transport direction of the sheet feeder 9.

The sheet feeder 9 includes a sheet feeding tray that accommodates a medium, such as paper, and a transport mechanism that transports the medium from the sheet feeding tray to the image former 11. The sheet feeder 9 includes a plurality of sheet feeding trays. Each of the sheet feeding trays accommodates sheets of the same sheet type. The different sheet feeding trays may accommodate sheets of the same sheet type or may accommodate sheets of different sheet types. In addition, the sheet feeder 9 may include a sorter mechanism that sorts media (sheets) on which an image is formed, a sheet discharge tray for discharging the media on which the image is formed, and a transport mechanism that transports the media on which the image is formed to the sorter mechanism and the sheet discharge tray. Furthermore, the sheet feeder 9 may include a transport mechanism that transports media on which an image is formed to the image inputter 7, and a transport mechanism that transports media from which an image is read by the image inputter 7 to the sheet discharge trays, the sorter mechanism, or the like.

The sheet feeder 9 transports a medium in the sub scanning direction of the image inputter 7. In the present application, as described above, a width of a sheet in a direction orthogonal to the transport direction of a medium (sheet) is referred to as a sheet width. Therefore, in this embodiment, the sheet width can also be referred to as a width of a sheet in the main scanning direction of the image inputter 7. The sheet feeder 9 transports a medium in such a way that a longitudinal direction of an unillustrated fixing belt of the fixing unit 11*a*, and a transport direction of a medium are orthogonal to each other.

The image former 11 forms (prints) an image on a medium, such as a copy sheet, based on image data. A printing method of the image former 11 is a laser printer. The image former 11 may be a monochrome laser printer or a color laser printer. The image former 11 may include a sheet feeding mechanism that supplies media, a transport mechanism that transports media, and a sorter mechanism that sorts media after an image is formed.

The fixing unit 11*a* is a fuser and is detachable from the image former 11. The fixing unit 11*a* fuses a toner image on a sheet by applying heat and pressure to the toner image transferred on the sheet.

The fixing unit information storage 11*al* is a machine readable storage, and is an Integrated Circuit (IC) chip or a Radio Frequency Identification (RFID) tag, for example. The fixing unit information storage 11*al* stores fixing unit information of the fixing unit 11*a*. The fixing unit information includes identification information for uniquely identifying the fixing unit 11*a* (hereinafter, simply referred to as identification information) and a unit type of the fixing unit 11*a* (hereinafter, referred to as a fixing unit type). The fixing unit type is determined by a user based on sheet specifications including a sheet size (for example, lengths of a long side and a short side, an A size, a B size, or the like) in which the fixing unit may be used at the time of image formation. The sheet specifications other than the sheet size are, for example, a thickness of a sheet and a sheet type (for example, non-coated sheet, gloss coated sheet, mat course sheet, embossed sheet, and the like). In a state in which the fixing unit 11*a* is attached to the image former 11, the controller 19 newly writes or updates the fixing unit type in accordance with an operation performed by the operation acceptor 5.

As has been described with reference to FIGS. 15A, 15B, 16A, and 16B, the present disclosure relates to scratches generated on the fixing belt along sides of a rectangular sheet that is substantially parallel to the transport direction (sub scanning direction) of the sheet when an image is formed on the sheet. Although positions of the scratches basically vary depending on a sheet size of a sheet that is in contact with the fixing unit at a time of image formation, when there is a specific relationship between two different sheet sizes, these two scratches are generated at the same positions on the fixing belt even when the image formation is performed on sheets of the two different sheet sizes. That is, when the two sheet sizes satisfy the following two conditions: (1) lengths (reference lengths) of sides in the direction (main scanning direction) substantially perpendicular to the sheet transport direction are equal to each other; and (2) lengths of sides substantially parallel to the sheet transport direction (sub scanning direction) are different from each other, scratches are generated at the same positions on the fixing belt due to contact with the sheets of these two sheet sizes. In general, A size sheets have sizes from A0 to A10, and a short side of an A size sheet of a certain size matches a long side of an A size sheet that is one size smaller than the A size sheet. For example, a short side of A3 sheets and a long side of A4 sheets are both 297 mm. Therefore, a fixing unit of a fixing unit type in which the short side of A3 sheets is set as a reference length may be used for printing of A3 sheets which are transported such that the short side is in the main scanning direction and for printing of A4 sheets which are transported such that the long side is in the main scanning direction. B size sheets having sizes from B0 to B10 have the same relationship. That is, a short side of B3 sheets and a long side of B4 sheets are both 364 mm, and therefore, when a fixing unit type indicates that the short side of B3 sheets is determined as a reference length, the fixing unit may be used for printing of B3 sheets which are transported such that the short side is in the main scanning direction and for printing of B4 sheets which are transported such that the long side is in the main scanning direction.

The fixing unit information acquirer 11*b* is a reader/writer for performing reading/writing on the fixing unit information storage 11*a*1. For example, when the fixing unit information storage 11*al* is an IC chip, the fixing unit information acquirer 11*b* is an IC chip reader/writer, whereas when the fixing unit information storage 11*al* is an RFID tag, the fixing unit information acquirer 11*b* is an RFID reader/writer.

The communicator 13 is connected to the network. For example, the communicator 13 is constituted by an interface that is connectable to a wired Local Area Network (LAN), a wireless LAN, or a Long Term Evolution (LTE) network. Since the communicator 13 is connected to the network, the image forming apparatus 1 is connected to other devices or an external network. Furthermore, the communicator 13 may be an interface that performs short-range wireless communication, such as Near Field Communication (NFC) or Bluetooth (registered trademark).

The connector 15 is used to connect the image forming apparatus 1 to other devices. For example, the connector 15 is a USB interface to which a USB memory or the like is connected. In addition, the connector 15 may be an HDMI (registered trademark) interface or the like instead of the USB interface.

The storage 17 is a functional section that stores various programs to be used in operations of the image forming apparatus 1 and various types of data. The storage 17 includes at least one of a recording device capable of performing transitory storage, such as a dynamic random access memory (DRAM) and a non-transitory recording device, such as a solid state drive (SSD) including a semiconductor memory or a hard disk drive (HDD) including a magnetic disc. Although the one storage 17 is used for convenience of explanation, the storage 17 may be configured as separate devices for purposes, such as an area (primary storage area) used for program execution, an area (auxiliary storage area) for storing programs and data, and an area used for caching.

The attached unit information storage 17*a* stores fixing unit information of the fixing unit 11*a* that is currently attached to the image forming apparatus 1. The fixing unit use history storage 17*b* stores a use history for each fixing unit. For example, the controller 19 stores the number of sheets on which images are formed as a use history in association with identification information of the fixing unit 11*a* for each sheet type. The controller 19 updates the use history of the fixing unit 11*a* being attached every time the image former 11 forms an image on a sheet. The sheet feeding tray information storage 17*c* stores sheet information relating to sheets in the plurality of sheet feeding trays, including sheet types of the sheets accommodated in the individual sheet feeding trays of the sheet feeder 9.

The controller 19 is a functional section for controlling the entire image forming apparatus 1. The controller 19 is constituted by one or a plurality of control devices or control circuits, and for example, is constituted by a Central Processing Unit (CPU), a System on a Chip (SoC), or the like. Furthermore, the controller 19 can realize functions by reading programs stored in the storage 17 and executing processes.

1.2 Operation of Image Forming Apparatus 1 in First Embodiment

Figure 2:
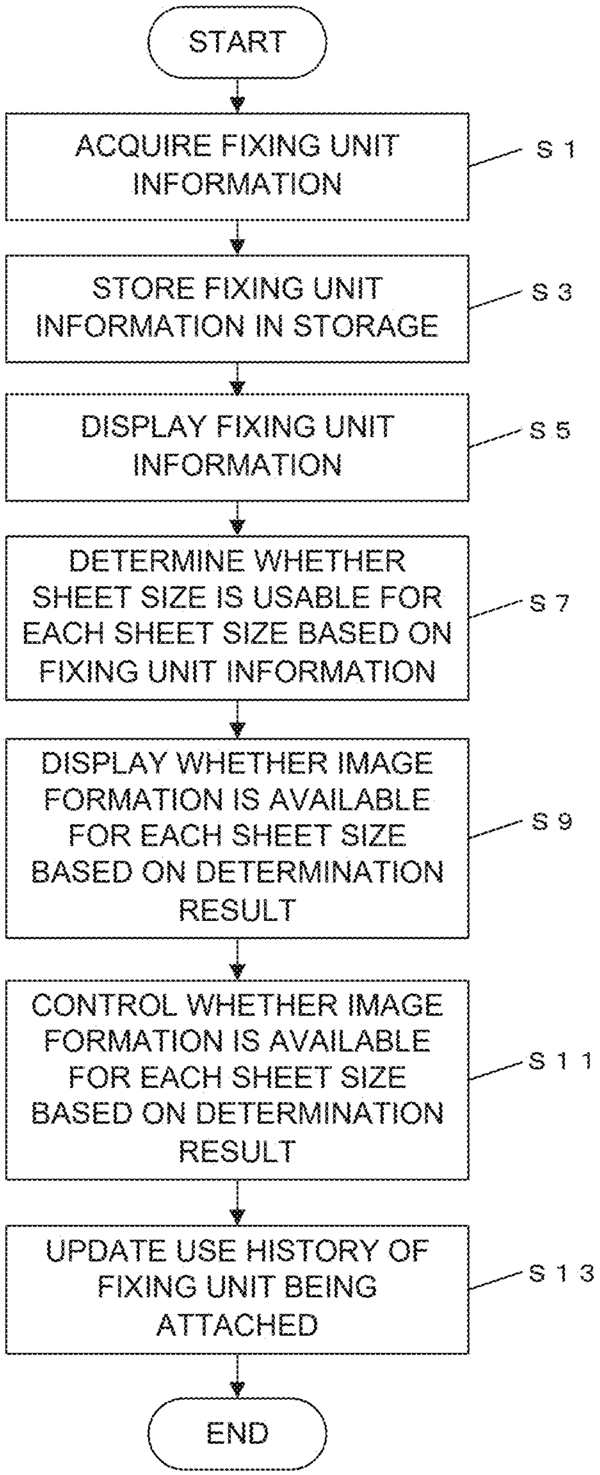
FIG. 2 is a flowchart for describing an operation of the image forming apparatus according to the first embodiment of the present disclosure.

FIG. 2 is a flowchart for describing an operation of the image forming apparatus 1. When the fixing unit 11*a* is attached to the image former 11, the controller 19 causes the fixing unit information acquirer 11*b* to acquire fixing unit information from the fixing unit information storage 11*a* (step S1). Subsequently, the controller 19 stores the acquired fixing unit information in the attached unit information storage 17*a* (step S3). Thereafter, the controller 19 displays the fixing unit information on the display 3 (step S5).

Then the controller 19 performs determinations based on the fixing unit information stored in the sheet feeding tray information storage 17*c* and the sheet information of the individual sheet feeding trays (step S7) In the determinations, it is determined for individual sheet feeding trays whether image formation may be performed using the attached fixing unit. Specifically, it is determined whether sheet sizes of the sheets accommodated in the individual sheet feeding trays are permitted to be used in the fixing unit type of the fixing unit information stored in the attached unit information storage 17*a*.

The controller 19 displays whether the sheet feeding trays are available in the display 3 for individual sheet sizes or individual sheet feeding trays based on results of the determinations performed in step S7 (step S9). Furthermore, before or after step S9, the controller 19 determines whether image formation is to be performed for individual sheet sizes or individual sheet feeding trays based on the results of the determinations performed in step S7 (step S11). That is, when an instruction for performing image formation using one of the sheet sizes or one of the sheet feeding trays permitted in step S7 is input via the operation acceptor 5 or the like, the controller 19 performs image formation based on this instruction. On the other hand, when an instruction for performing image formation using one of the sheet sizes or one of the sheet feeding trays which is not permitted in step S7 is input via the operation acceptor 5 or the like, the controller 19 does not perform image formation based on this instruction.

The controller 19 updates the use history of the fixing unit being attached based on a result of the determination as to whether the image formation is to be performed which is made in step S11 (step S13). When the image formation is executed in step S11, the controller 19 updates the use history of the attached fixing unit among use histories stored in the fixing unit use history storage 17*b* in accordance with the number of times the image formation is executed (the number of sheets on which an image is formed and output).

1.3 Screen Examples

Figure 3:
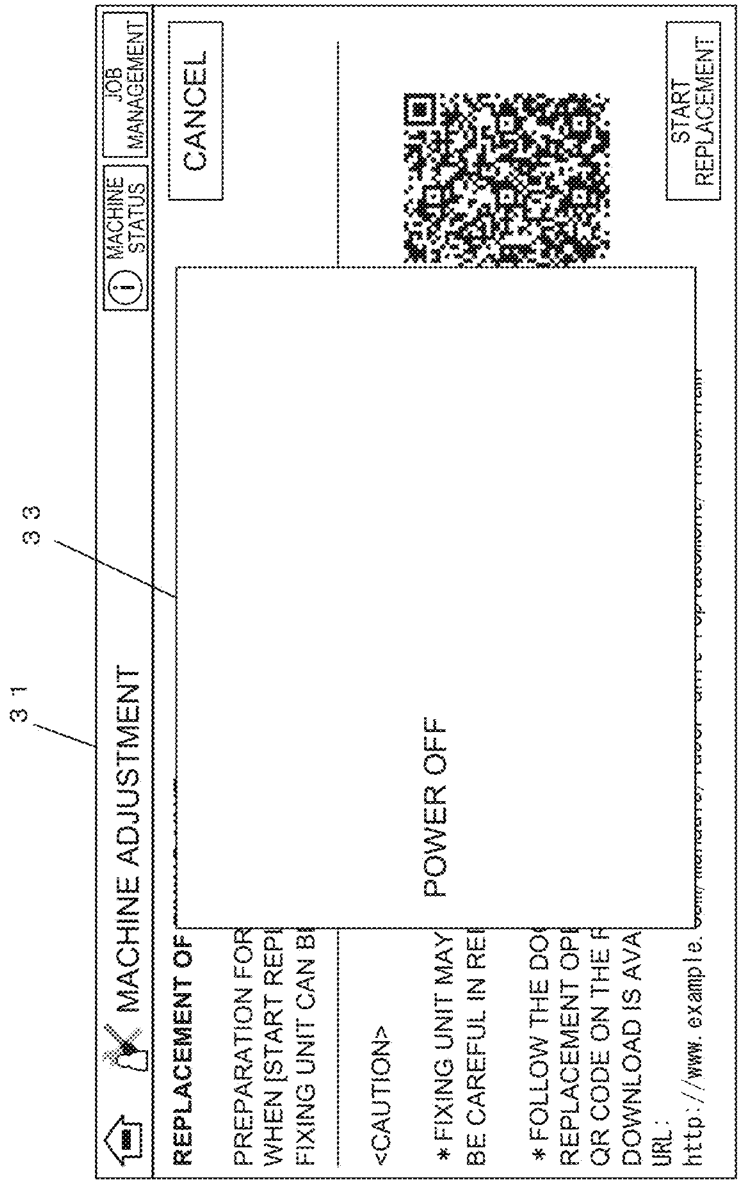
FIG. 3 is a diagram illustrating an example of a power off screen displayed on a display of the image forming apparatus according to the first embodiment of the present disclosure.

FIG. 3 is a diagram illustrating an example of a power off screen displayed on the display 3 of the image forming apparatus 1 according to the first embodiment of the present disclosure. When the main power SW 5*a* is operated to turn off a main power source before step S1, the controller 19 displays a power off screen 31 on the display 3. The power off screen 31 includes a message field 33 including a message informing the user that the main power source is being disconnected described therein. After the power off screen 31 is displayed and the main power SW 5*a* which has been turned off is turned on again, the controller 19 operates in accordance with the flowchart of FIG. 2.

Figure 4:
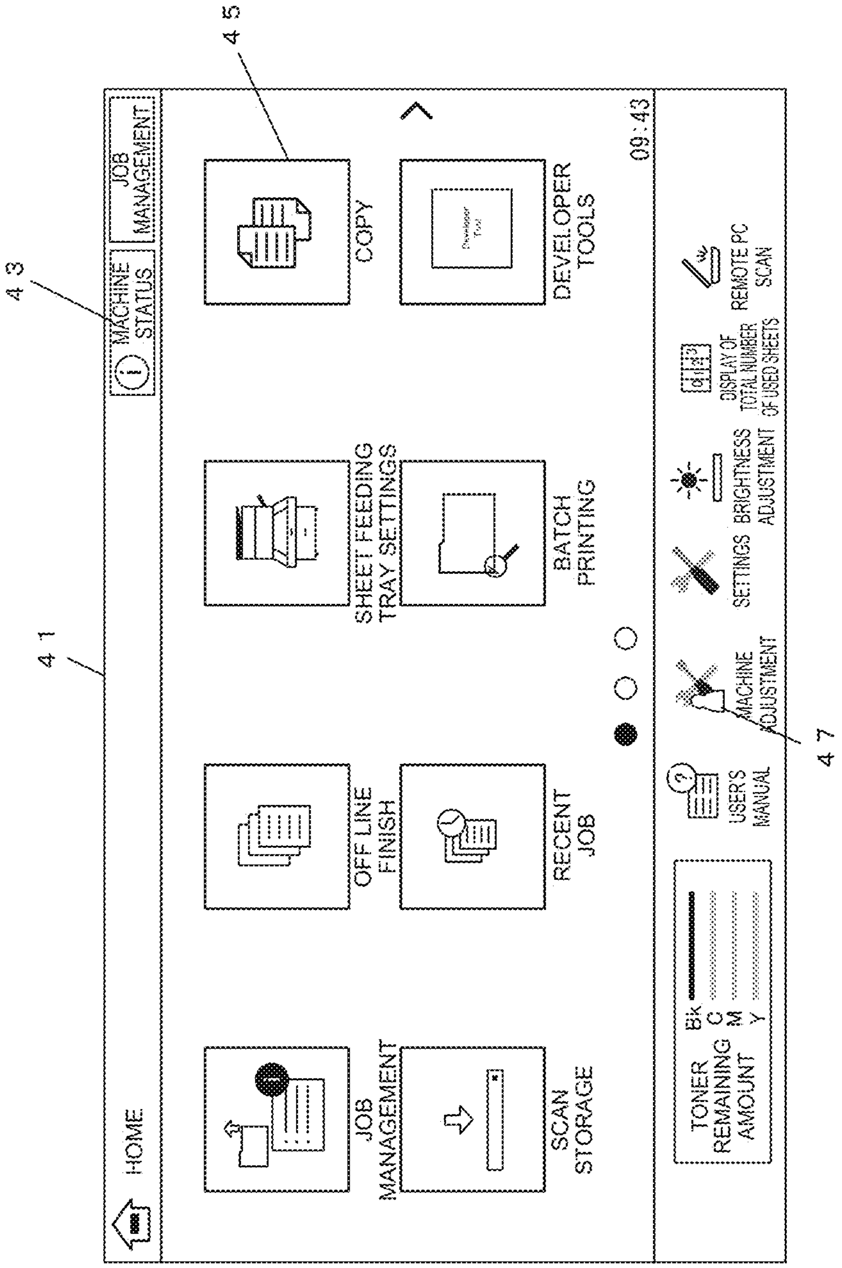
FIG. 4 is a diagram illustrating an example of a home screen displayed on the display of the image forming apparatus according to the first embodiment of the present disclosure.

FIG. 4 is a diagram illustrating an example of a home screen displayed on the display 3 of the image forming apparatus 1 according to the first embodiment of the present disclosure. A home screen 41 is initially displayed as a screen for accepting an operation performed by a user after the power of the image forming apparatus 1 is turned on, and is displayed before or after step S1. The home screen 41 includes a machine status button 43, a copy button 45, and a machine adjustment button 47.

The machine status button 43 is a screen element for transition of the screen displayed in the display 3 to a machine status screen 51 described below in accordance with an operation performed on the operation acceptor 5. The copy button 45 is a screen element for transition of the screen displayed in the display 3 to a copy screen 71 described below in accordance with an operation performed on the operation acceptor 5. The machine adjustment button 47 is a screen element (icon) for transition of the screen displayed in the display 3 to a machine adjustment screen not illustrated.

Figure 5:
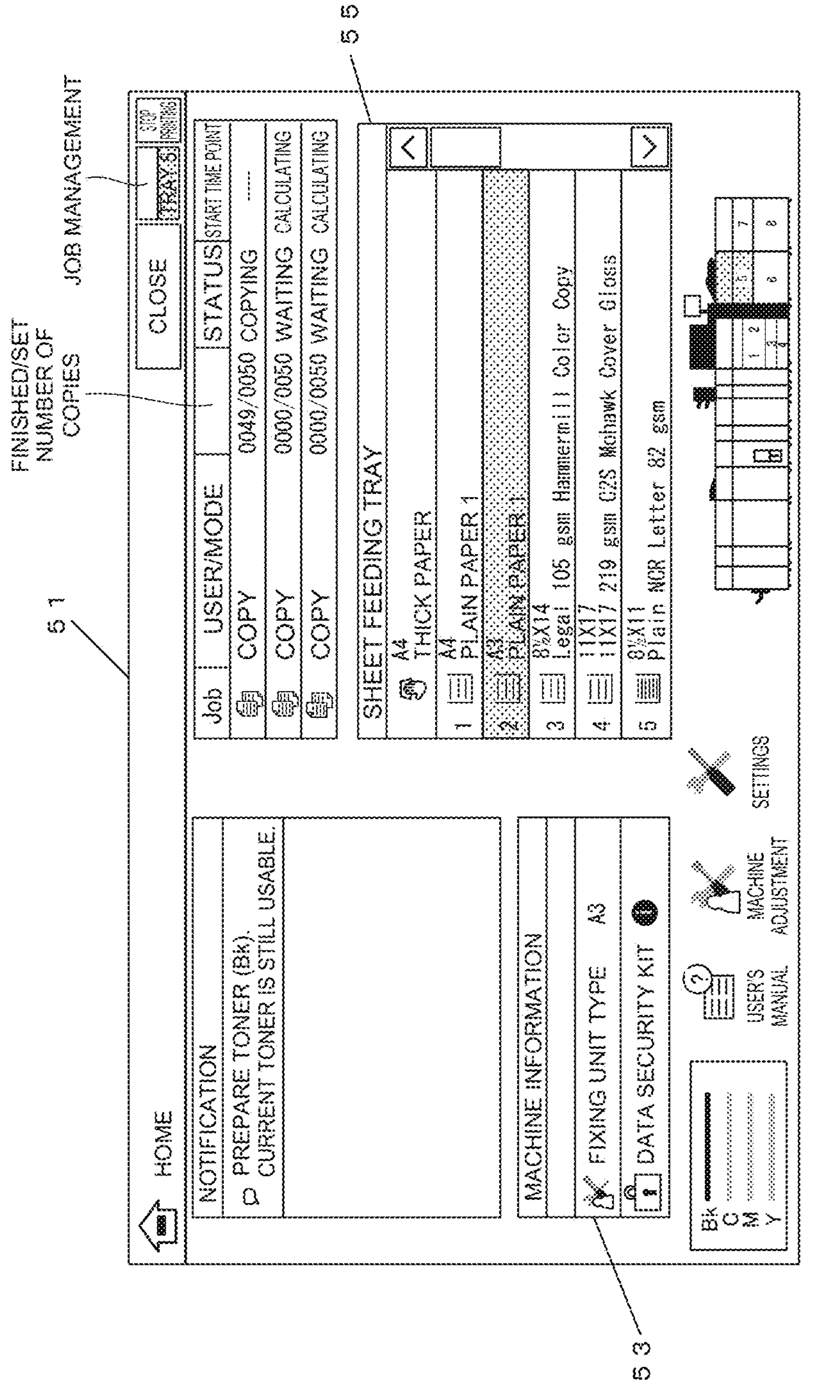
FIG. 5 is a diagram illustrating an example of a machine status screen displayed on the display of the image forming apparatus according to the first embodiment of the present disclosure.
Figure 6A:
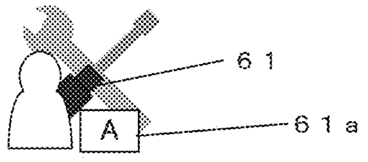
FIG. 6A is a diagram illustrating an example of an icon displayed on the display of the image forming apparatus according to the first embodiment of the present disclosure.
Figure 6B:
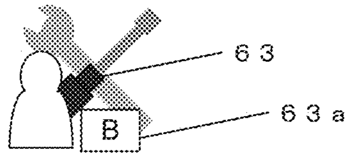
FIG. 6B is a diagram illustrating an example of an icon displayed on the display of the image forming apparatus according to the first embodiment of the present disclosure.
Figure 6C:
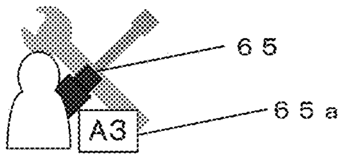
FIG. 6C is a diagram illustrating an example of an icon displayed on the display of the image forming apparatus according to the first embodiment of the present disclosure.
Figure 6D:
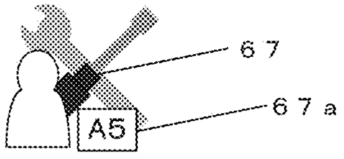
FIG. 6D is a diagram illustrating an example of an icon displayed on the display of the image forming apparatus according to the first embodiment of the present disclosure.

FIG. 5 is a diagram illustrating an example of a machine status screen displayed on the display 3 of the image forming apparatus 1 according to the first embodiment of the present disclosure. The machine status screen 51 is displayed in step S5. The machine status screen 51 includes a fixing unit type display 53. When the fixing unit type display 53 is displayed based on the fixing unit information read from the fixing unit information storage 11*al* of the fixing unit 11*a* currently attached to the image former 11 in step S1. In this example, a sheet size "A3" is displayed as the fixing unit type display 53.

FIGS. 6A to 6D are diagrams illustrating examples of an icon displayed on the display 3 of the image forming apparatus 1 according to the first embodiment of the present disclosure. Icons 61, 63, 65, and 67 are used instead of the machine adjustment button 47 in the home screen 41.

Display of the home screen 41 with one of the icons 61, 63, 65, and 67 instead of the machine adjustment button 47 corresponds to step S5.

The icons 61, 63, 65, and 67 have fixing unit type displays 61*a*, 63*a*, 65*a*, and 67*a*, respectively. The fixing unit type displays 61*a*, 63*a*, 65*a*, and 67*a* are displayed based on the fixing unit information read in step S1 from the fixing unit information storage 11*al* of the fixing unit 11*a* currently attached to the image former 11.

The fixing unit type display 61*a* indicates that the fixing unit type is "A", and the fixing unit type display 63*a* indicates that the fixing unit type is "B". In the fixing unit type displays 61*a* and 63*a*, "A" and "B" are simply names. The fixing unit type displays 65*a* and 67*a* display a specific A series size or a specific B series size, respectively, as the fixing unit types. The fixing unit type display 65*a* indicates that the fixing unit type is "A3". The fixing unit type display 67*a* indicates that the fixing unit type is "A5".

Figure 7:
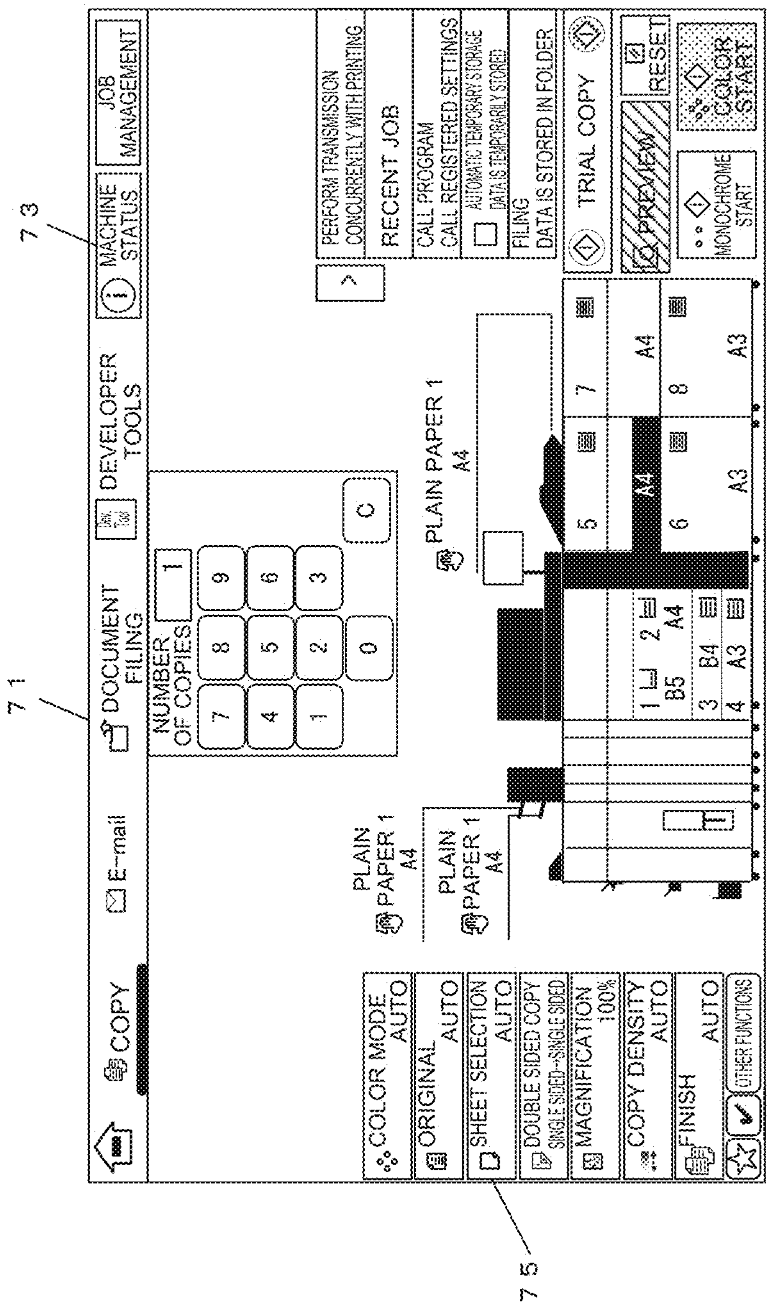
FIG. 7 is a diagram illustrating an example of a copy screen displayed on the display of the image forming apparatus according to the first embodiment of the present disclosure.

FIG. 7 is a diagram illustrating an example of the copy screen displayed on the display 3 of the image forming apparatus 1 according to the first embodiment of the present disclosure. The copy screen 71 includes a machine status button 73 and a sheet selection button 75. The machine status button 73 is a screen element for transition of the screen displayed in the display 3 to the machine status screen 51 in accordance with an operation performed on the operation acceptor 5. The sheet selection button 75 is a screen element for transition of the screen displayed in the display 3 to a sheet selection screen 81 described below in accordance with an operation performed on the operation acceptor 5.

Figure 8:
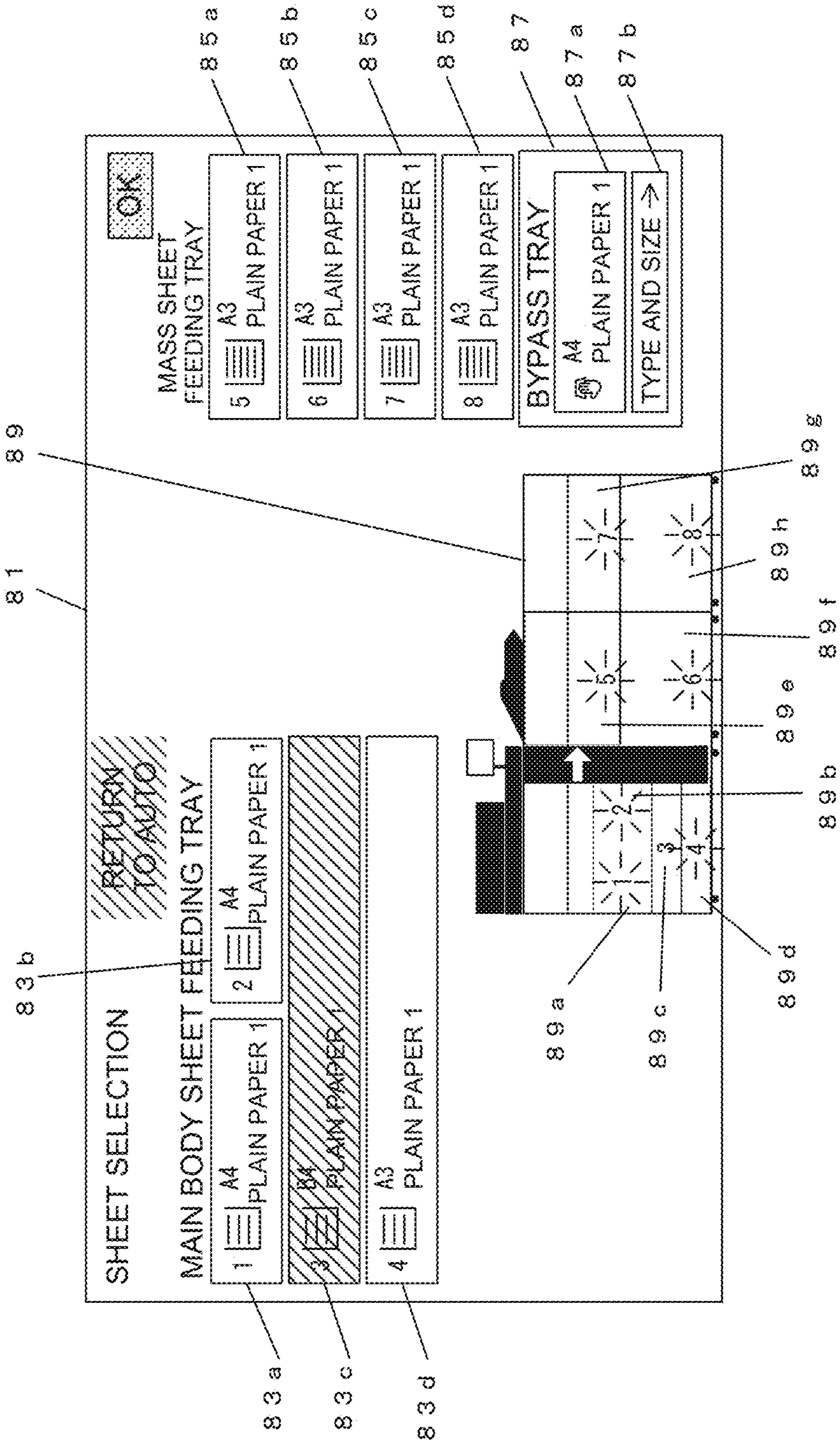
FIG. 8 is a diagram illustrating an example of a sheet selection screen displayed on the display of the image forming apparatus according to the first embodiment of the present disclosure.

FIG. 8 is a diagram illustrating an example of the sheet selection screen displayed on the display 3 of the image forming apparatus 1 according to the first embodiment of the present disclosure. The display of the sheet selection screen 81 corresponds to step S9. The sheet selection screen 81 includes main body sheet feeding tray displays 83*a* to 83*d*, mass sheet feeding tray displays 85*a* to 85*d*, bypass tray displays 87, 87*a*, and 87*b*, machine diagram displays 89 and 89*a* to 89 *h*. Hereinafter, the main body sheet feeding tray displays 83*a* to 83*d*, the mass sheet feeding tray displays 85*a* to 85*d*, and the bypass tray displays 87, 87*a*, and 87*b* are also collectively referred to as a tray display. The tray display is a screen element that can be selected by an operation via the operation acceptor 5. The controller 19 causes the image former 11 to form an image using the sheets accommodated in a selected one of the trays.

The image forming apparatus 1 has the eight sheet feeding trays in total, that is, the four sheet feeding trays disposed in the main body of the image forming apparatus 1 and the four mass sheet feeding trays externally attached to the image forming apparatus 1. The eight sheet feeding trays have sequential numbers from 1 to 8 as tray numbers. The controller 19 reads, from the sheet feeding tray information storage 17*c*, sheet information associated with sheets accommodated in the first to eighth sheet feeding trays and displays the sheet information as the main body sheet feeding tray displays 83*a* to 83*d* and the mass sheet feeding tray displays 85*a* to 85*d*.

The main body sheet feeding tray displays 83*a* to 83*d* are screen elements for displaying sheet types accommodated in the four sheet feeding trays disposed in the main body of the image forming apparatus 1. The main body sheet feeding tray displays 83*a* to 83*d* correspond to the first to fourth sheet feeding trays. The mass sheet feeding tray displays 85*a* to 85*d* are screen elements for displaying sheet types accommodated in the four mass sheet feeding trays externally added to the image forming apparatus 1. The mass sheet feeding tray displays 85*a* to 85*d* correspond to the fifth to eighth sheet feeding trays.

In the sheet selection screen 81 of FIG. 8, A4 is displayed as a sheet size and plain paper 1 is displayed as a sheet type (a type of sheets) in the main body sheet feeding tray displays 83*a* and 83*b*. B4 is displayed as a sheet size and plain paper 1 is displayed as a sheet type in the main body sheet feeding tray display 83*c*. A3 is displayed as a sheet size and plain paper 1 is displayed as a sheet type in the main body sheet feeding tray display 83*d*. A3 is displayed as a sheet size and plain paper 1 is displayed as a sheet type in the mass sheet feeding tray displays 85*a* to 85*d*.

In the sheet selection screen 81 of FIG. 8, among the main body sheet feeding tray displays 83*a* to 83*d* and the mass sheet feeding tray displays 85*a* to 85*d*, only the main body sheet feeding tray display 83*c* is hatched. This hatching line indicates that the main body sheet feeding tray display 83*c* may not be selected (by grayed out or the like). The selection unavailable display of the main body sheet feeding tray display 83*c* corresponds to step S9.

Specifically, the controller 19 performs the determination in step S7 (in this case, a determination based on the fixing unit information of the fixing unit 11*a* currently attached to the image former 11 which is stored in the attached unit information storage 17*a* and sheet information of the third main body sheet feeding tray which is stored in the sheet feeding tray information storage 17*c*). The controller 19 displays the main body sheet feeding tray display 83*c* as selection unavailable (by grayed out display, for example) based on a result of the determination. When the tray display in the selection unavailable display (grayed out display) is operated, the controller 19 does not accept the operation by ignoring the operation or the like. In this way, control of a determination as to whether to form an image is performed in step S11.

Note that display forms of the machine diagram displays 89*a* to 89*h* are changed in accordance with whether the first to eight sheet feeding trays are selectable. That is, the machine diagram displays 89*a*, 89*b*, and 89*d* to 89*h* respectively corresponding to the first, second, fourth to eighth sheet feeding trays are displayed in an emphasized manner to indicate that they are selectable (eight radial lines drawn around numerals of the tray numbers indicate the emphasized display). On the other hand, the machine diagram display 89*c* corresponding to the third sheet feeding tray is not emphasized in display.

The bypass tray display 87 relates to the bypass tray of the image forming apparatus 1. A bypass tray display 87*a* displays a sheet size and a sheet type of sheets to be inserted into the bypass tray, which are set by the user via the operation acceptor 5. A bypass tray display 87*b* is a screen element for screen transfer to a sheet selection screen 101 described below or a sheet selection screen 110 described below.

Figure 9:
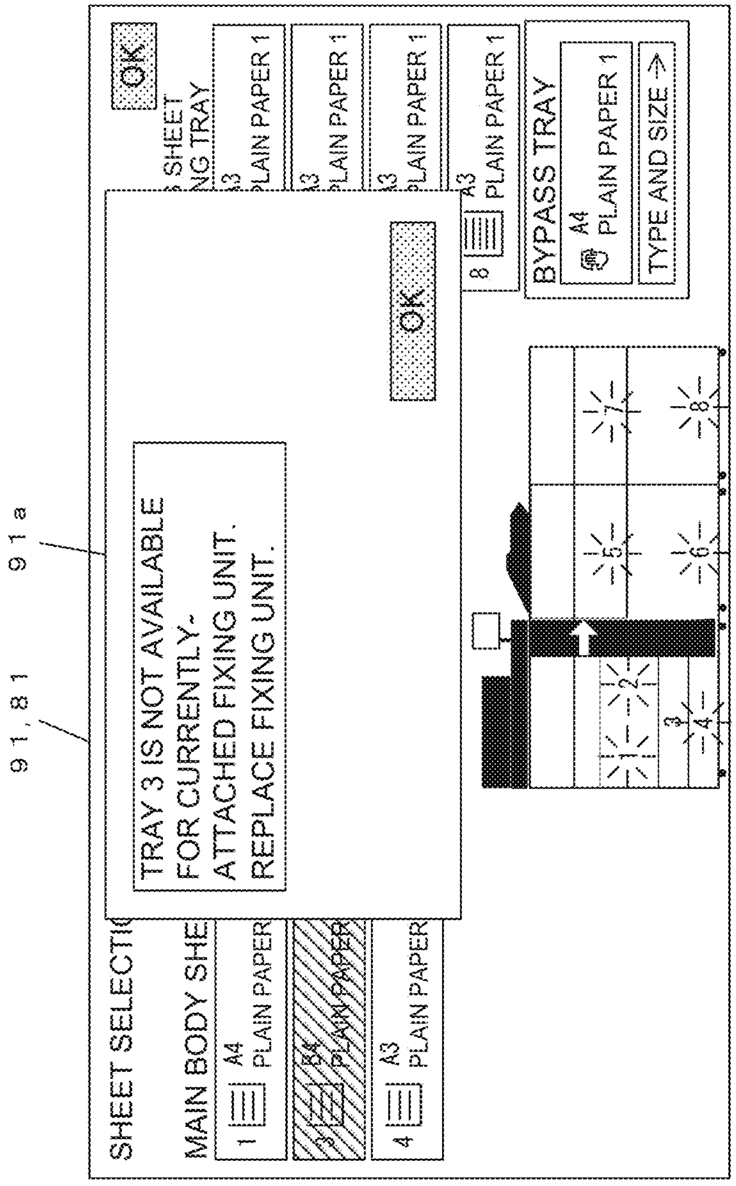
FIG. 9 is a diagram illustrating an example of the sheet selection screen displayed on the display of the image forming apparatus according to the first embodiment of the present disclosure.

FIG. 9 is a diagram illustrating another example of the sheet selection screen displayed on the display 3 of the image forming apparatus 1 according to the first embodiment of the present disclosure. When the main body sheet feeding tray display 83*c* is operated via the operation acceptor 5 while the sheet selection screen 81 is displayed on the display 3, the controller 19 performs screen transition to display a sheet selection screen 91 on the display 3. The sheet selection screen 91 is displayed such that a message field 91*a* is superposed on the sheet selection screen 81. The message field 91*a* displays a message indicating that the sheets accommodated in the third sheet feeding tray (tray 3) corresponding to the main body sheet feeding tray display 83*c* may not be used in the currently attached fixing unit 11*a*, and that the currently attached fixing unit 11*a* is required to be replaced with another fixing unit when an image is formed using the sheets in the third sheet feeding tray.

Figure 10:
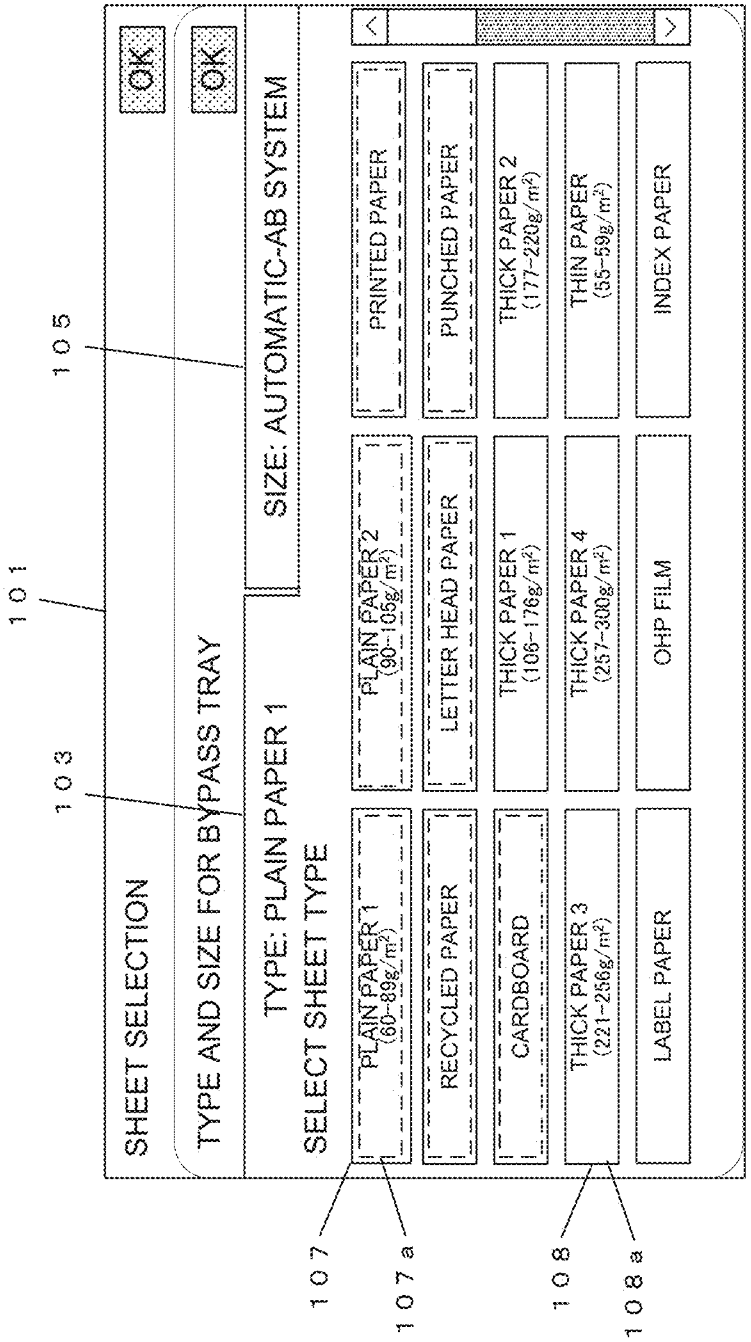
FIG. 10 is a diagram illustrating an example of the sheet selection screen displayed on the display of the image forming apparatus according to the first embodiment of the present disclosure.

FIG. 10 is a diagram illustrating another example of the sheet selection screen displayed on the display 3 of the image forming apparatus 1 according to the first embodiment of the present disclosure. The sheet selection screen

101 is an example of a transition destination of the screen transition from the sheet selection screen 81, when the bypass tray display 87*b* is operated via the operation acceptor 5 while the sheet selection screen 81 is displayed on the display 3. The sheet selection screen 101 is an example in which selectable candidates for the currently attached fixing unit are displayed in an emphasized manner on a screen for selecting a type and a size of sheets.

The sheet selection screen 101 is used to select a type and a size of sheets to be manually inserted. The sheet selection screen 101 includes tabs 103 and 105. The tab 103 is used to select a type of sheets, and the tab 105 is used to select a size of sheets. In FIG. 10, a state in which the tab 103 is selected is illustrated. In the tab 103, 15 buttons of 5 rows by 3 columns are displayed in total. Each of the 15 buttons corresponds to one type of sheet type candidate.

The sheet selection screen 101 is an example of the display in step S9, and available types of sheet are displayed in an emphasized manner. For example, "plain paper 1 (60 to 89 g/m$^2$)" is displayed on the button 107, and a frame line 107*a* of the button 107 is displayed in an emphasized manner to indicate that the button 107 is selectable. In FIG. 10, a rectangle of a dotted line is displayed inside a rectangle of a solid line to indicate the emphasized display as a frame line 107*a*. The rectangle of the dotted line indicates the emphasized display. On the other hand, in the button 108, "thick paper 3 (221 to 256 g/m$^2$)" is displayed, and only a rectangle of a solid line is displayed as a frame line 108*a* and a rectangle of a dotted line is not displayed. In this way, since only the selectable buttons are displayed in an emphasized manner on the sheet selection screen 101, the user is informed whether the buttons are selectable. Furthermore, when an operation is performed on a button which has not been subjected to the emphasized display via the operation acceptor 5, the controller 19 does not accept the operation by ignoring the operation or the like to thereby perform the control in step S11.

Figure 11:
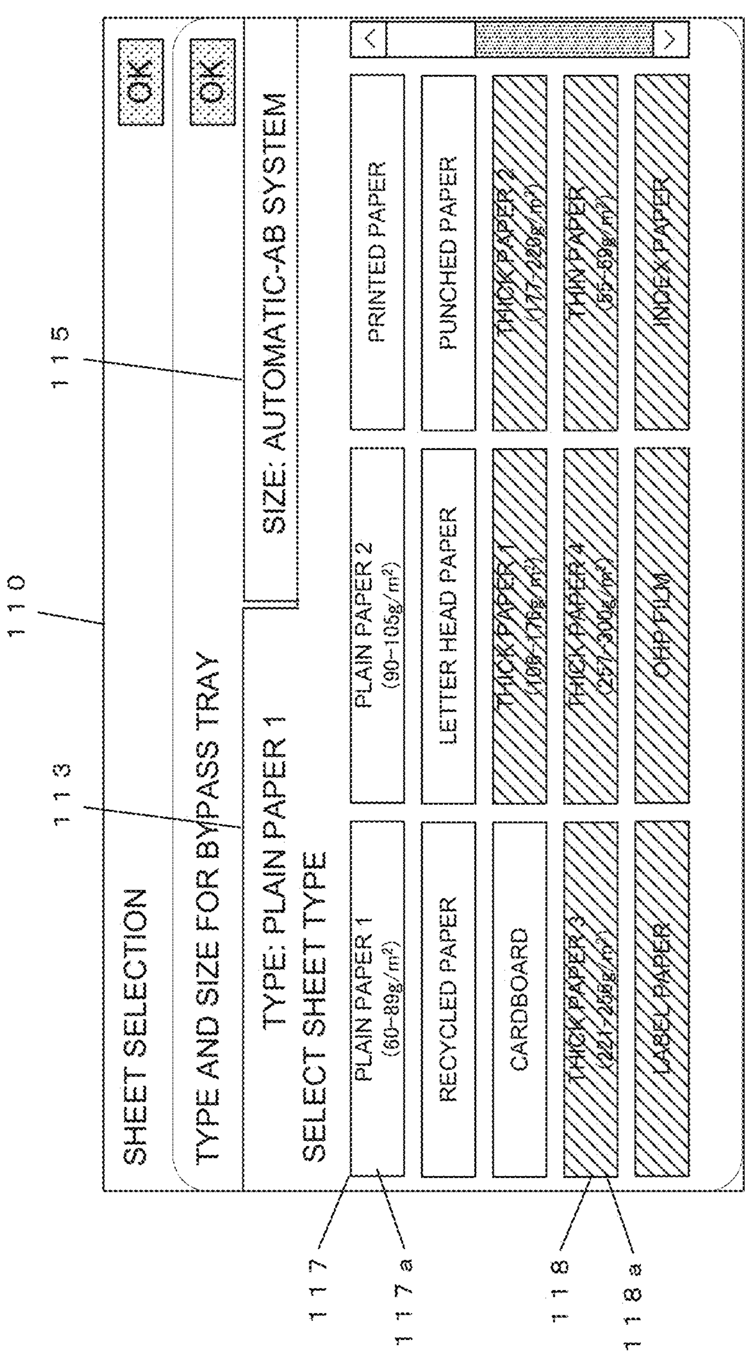
FIG. 11 is a diagram illustrating an example of the sheet selection screen displayed on the display of the image forming apparatus according to the first embodiment of the present disclosure.

FIG. 11 is a diagram illustrating another example of the sheet selection screen displayed on the display 3 of the image forming apparatus 1 according to the first embodiment of the present disclosure. The sheet selection screen 110 is another example of a transition destination of screen transition from the sheet selection screen 81, when the bypass tray display 87*b* is operated via the operation acceptor 5 while the sheet selection screen 81 is displayed on the display 3. The sheet selection screen 110 is an example in which selectable candidates for the currently attached fixing unit are displayed in a selection unavailable manner on the screen for selecting a type and a size of sheets.

As with the sheet selection screen 101, the sheet selection screen 110 is used to select a type and a size of sheets to be set to the bypass tray, and includes tabs 113 and 115. The tab 113 is used to select a type of sheets, and the tab 115 is used to select a size of sheets. In FIG. 11, a state in which the tab 113 is selected is illustrated. In the tab 113, 15 buttons of 5 rows by 3 columns are displayed in total. Each of the 15 buttons corresponds to one type of sheet type candidate.

In the sheet selection screen 110, the 15 types of button corresponding to the sheet types in the but 113 are the same as the 15 types of button corresponding to the sheet types in the tab 103 of the sheet selection screen 101. However, only a display mode indicating whether the buttons are enabled or disabled is different.

For example, although "plain paper 1 (60 to 89 g/m$^2$)" is displayed in a button 117 similarly to the button 107, a frame line 117*a* is constituted only by a rectangle of a solid line and an emphasis display is not applied unlike the button 107. On the other hand, although "thick paper 3 (221 to 256 g/m$^2$)" is displayed in a button 118 similarly to the button 108, an inside of a frame line 118*a* is hatched. The hatched line indicates selection unavailable display (by grayed out display, for example). The hatched line indicates selection unavailable display (by grayed out display, for example) for the user.

1.4 Effects

The following advantageous effects are provided according to the first embodiment. A type of the fixing unit 11*a* currently attached to the image forming apparatus 1 can be displayed (step S5 and FIGS. 5 and 6A to 6D). Accordingly, the user can recognize a type of the fixing unit 11*a* currently attached to the image forming apparatus 1 without detaching the fixing unit 11*a* from the image forming apparatus 1.

A sheet feeding tray accommodating sheets available for the fixing unit 11*a* which is currently attached can be displayed (step S9 and FIGS. 8 to 11). Accordingly, the user can recognize a sheet feeding tray accommodating sheets available for the fixing unit 11*a* which is currently attached.

Image formation using unavailable sheets can be restricted while image formation using sheets available for the fixing unit 11*a* which is currently attached is permitted (step S11).

Accordingly, the user does not execute image formation using sheets which are not appropriate in use in the fixing unit 11*a* which is currently attached.

2. Second Embodiment

A second embodiment will be described. Note that only portions that are different from the first embodiment are described, and descriptions of the same portions are omitted.

In the second embodiment, an image forming apparatus 1 has a function of collectively executing a plurality of print jobs registered in advance. Hereinafter, this function is referred to as a batch printing function. Functions relating to the batch printing function include, for example, a print release function and a document filing function. As the print release function, one of a plurality of image forming apparatuses connected to one another via a network is set as a master unit and the others are set as slave units, and the slave units receive print data (data relating to an image to be formed on a sheet) registered in advance in the master unit via the network and print the print data (image formation). As the document filing function, print data of a document or the like to be frequently printed is registered in advance in a storage 17 of the image forming apparatus 1 and the document or the like is printed using the registered print data.

In the second embodiment, print jobs which are executable in the batch printing function is managed according to a type of a fixing unit which is currently attached as job management control.

Figure 12:
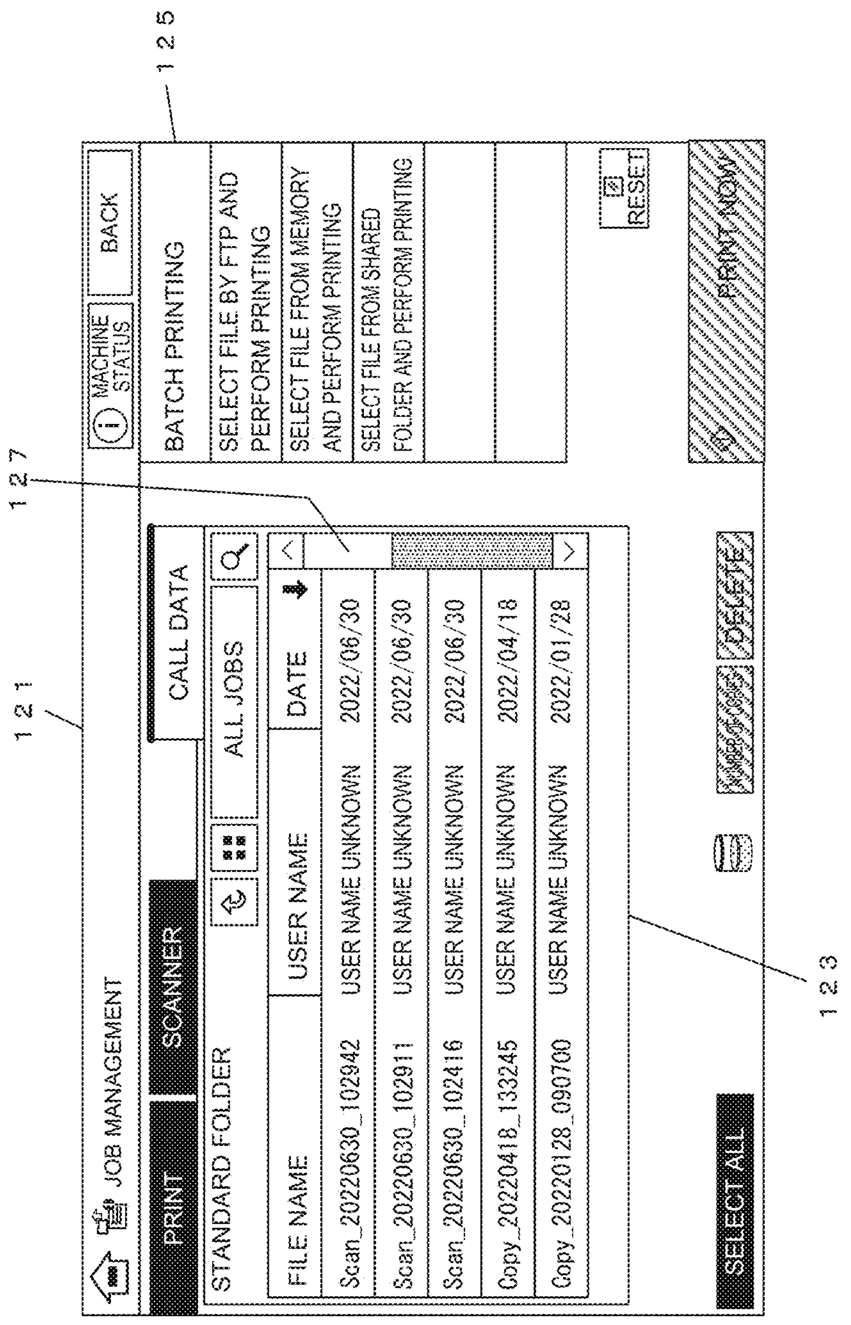
FIG. 12 is a diagram illustrating an example of a job management screen displayed on a display of an image forming apparatus according to a second embodiment of the present disclosure.

FIG. 12 is a diagram illustrating an example of a job management screen displayed on a display 3 of the image forming apparatus 1 according to the second embodiment of the present disclosure. A job management screen 121 includes a registered job list 123, a batch printing button 125, and a scroll bar 127. The registered job list 123 is a screen element indicating a list of print jobs registered in the image forming apparatus 1. The batch printing button 125 is a screen element for instructing the image forming apparatus 1 to execute batch printing. A scroll bar 127 is a screen element for scrolling the registered job list 123 in a vertical direction.

In the example of FIG. 12, five print jobs registered in the image forming apparatus 1 are displayed in the registered job list 123. Note that, although other print jobs, not illustrated, have also registered in the image forming apparatus 1, only five files having file names "Scan_20220630_102942.pdf", "Scan_20220630_102911.pdf", "Scan_20220630_102416.pdf", "Copy_20220418_133245.pdf", and "Copy_20220128_090700.pdf" are displayed as print jobs among all the registered print jobs in a current display position indicated by the scroll bar 127. Note that, in the registered job list 123, an extension "pdf" of the individual files is not displayed due to a limited display space. A controller 19 can display the other registered print jobs by scrolling the registered job list 123 downward in accordance with an operation of the scroll bar 127 via an operation acceptor 5. Sheet sizes, not illustrated, are set for the individual print jobs. A print job, a file name of a file to be printed, a sheet size used for printing, a user name, and a registration date are associated with one another and stored in a storage 17 as registered job data not illustrated.

It is assumed here that, among the print jobs currently registered in the image forming apparatus 1, a sheet size of A3 is set to the files "Scan_20220630_102942.pdf" and "Scan_20220630_102941.pdf" and a sheet size of A5 is set to the other print jobs. Note that, although both the files "Scan_20220630_102942.pdf" and "Scan_20220630_102941.pdf" are the registered print jobs, the file "Scan_20220630_102942.pdf" is displayed in the registered job list 123 whereas the file "Scan_20220630_102941.pdf" is not displayed in the registered job list 123 when the scroll bar 127 is located in the position illustrated in FIG. 12. Furthermore, it is assumed that a fixing unit type of a fixing unit 11*a* currently attached to the image forming apparatus 1 is a sheet size of A3.

In this case, when the batch printing button 125 is operated via the operation acceptor 5, the controller 19 extracts a print job corresponding to a sheet size which is printable by the fixing unit 11*a* which is currently attached from the print job data stored in the storage 17. As described above, the fixing unit type of the fixing unit 11*a* currently attached is the sheet size of A3, and only the print jobs corresponding to the files "Scan_20220630_102942.pdf" and "Scan_20220630_102941.pdf" use this sheet size.

Figure 13:
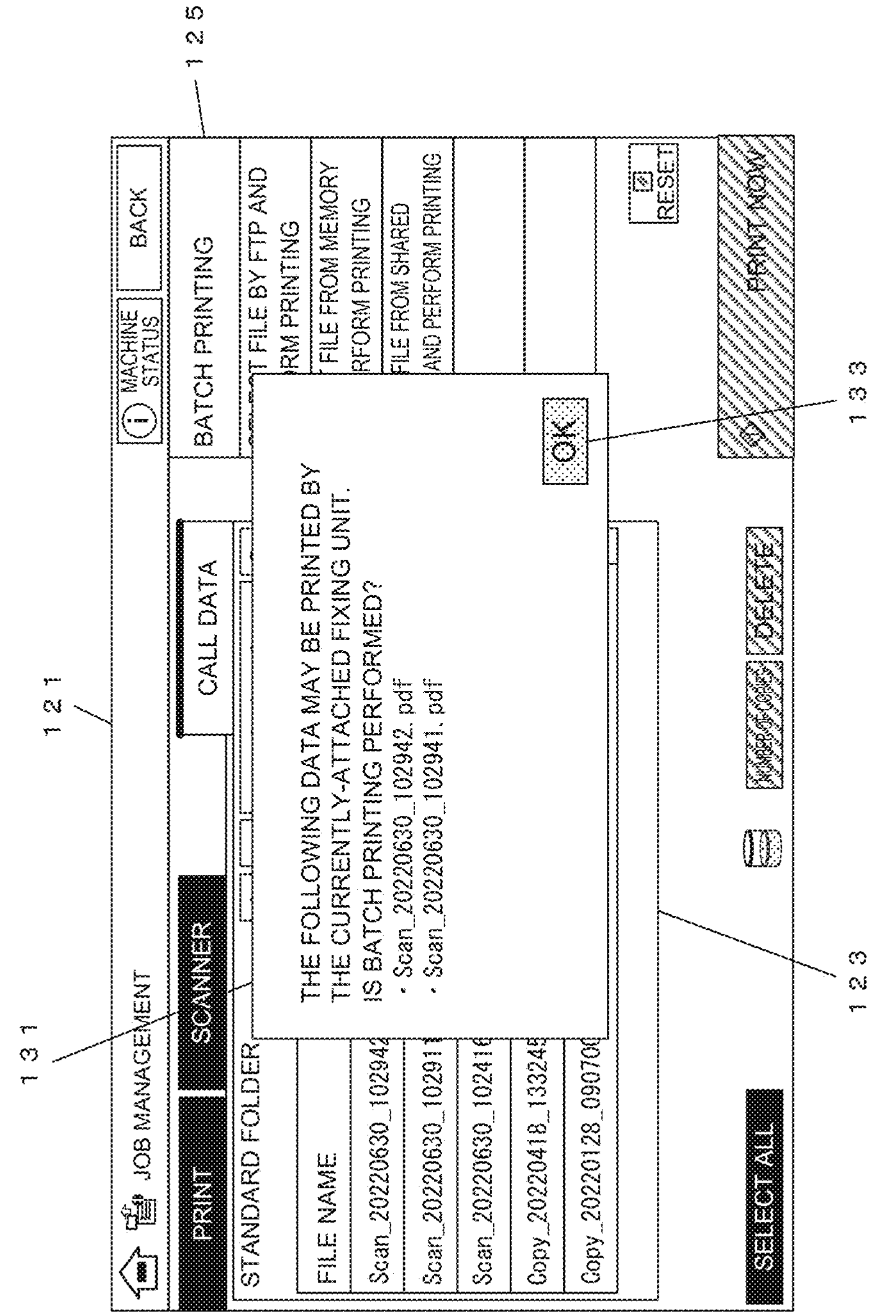
FIG. 13 is a diagram illustrating an example of the job management screen displayed on the display of the image forming apparatus according to the second embodiment of the present disclosure.

In this case, the controller 19 displays a message field 131 on the job management screen 121 in an overlapping manner as illustrated in FIG. 13. The message field 131 displays for confirmation that the extracted files can be printed by the currently attached fixing unit 11*a*. When an OK button 133 is operated via the operation acceptor 5, the controller 19 executes, by means of the image former 11, the jobs for printing the extracted files "Scan_20220630_102942.pdf" and "Scan_20220630_102941.pdf". At this time, the other print jobs using the sheet size A5 are not executed.

According to the second embodiment, when execution of batch printing is instructed for a plurality of registered print jobs, the image forming apparatus 1 may extract only print jobs which are printable by the fixing unit type of the fixing unit 11*a* and display the extracted print jobs for a user, and may accept an instruction for the batch printing to be performed only on the extracted print jobs. Accordingly, execution of printing using sheets which are not suitable for the fixing unit type of the fixing unit can be avoided at a time of the batch printing.

Furthermore, according to the second embodiment, when execution of the batch printing is instructed for a plurality of registered print jobs, the image forming apparatus 1 may extract only print jobs which are printable by the fixing unit type of the fixing unit 11*a* among a plurality of print jobs.

It is assumed that print jobs are executed in order of registration dates of registered job data. In this case, the print jobs corresponding to the registered job data are not sorted according to a sheet size. Therefore, the following situation may occur. That is, as an execution order, a print job using A3 sheets is executed, a print job using A5 sheets is executed, and thereafter, a print job using A3 sheets is executed again. In the image forming apparatus 1, since the fixing units are selectively used depending on a sheet, when such an execution order is employed, a large number of operations are required to be performed for replacing the fixing units.

However, according to the second embodiment, print jobs using the same sheet size are collectively executed. Therefore, according to the second embodiment, the number of times of replacement of the fixing unit 11*a* may be minimized even when print jobs of different sheet sizes are registered.

3. Third Embodiment

A third embodiment will be described. Note that only portions that are different from the first embodiment are described, and descriptions of the same portions are omitted.

Figure 16B:
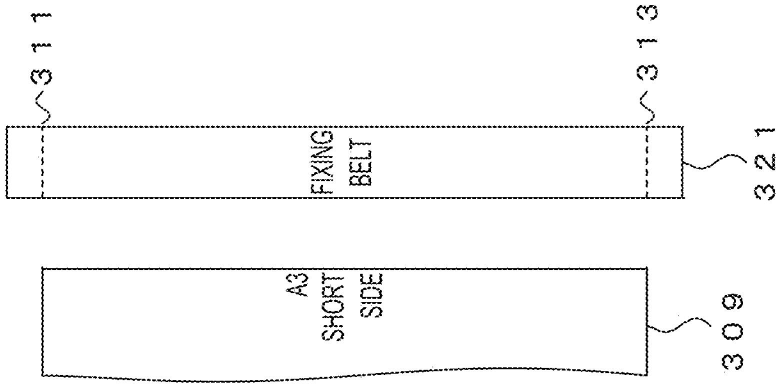
FIG. 16B is a diagram for describing scratches generated on a fixing belt for an A3 sheet when the A3 sheet passes.
Figure 16A:
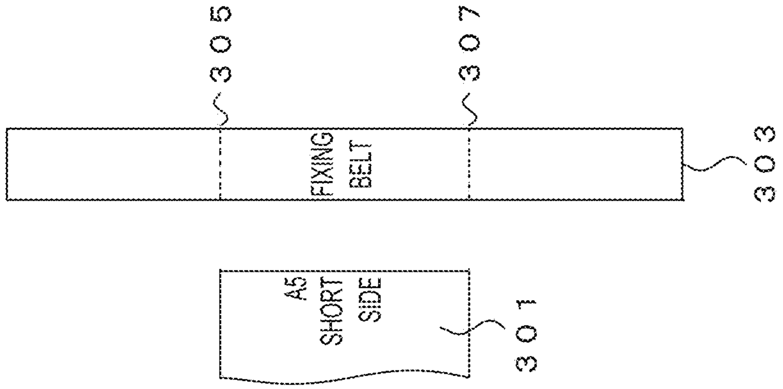
FIG. 16A is a diagram for describing scratches generated on the fixing belt for A5 sheets when an A5 sheet passes.

As illustrated with reference to FIGS. 16A and 16B, the scratches 311 and 313 are generated in positions corresponding to a length of a short side of A3 sheets on the fixing belt 321 of the fixing unit used in the printing of the A3 sheet 309. Therefore, even in the fixing unit 11*a* in which the fixing unit type is set as the A3 sheet, when the A3 sheets are repeatedly printed, scratches corresponding to the scratches 311 and 313 are generated. However, in the fixing unit 11*a* in which the fixing unit type is set as the A3 sheets, printing using other sheet sizes is not performed, and therefore, similar scratches are not generated inside the scratches 311 and 313. Focusing on this point, in the third embodiment, a fixing unit in which a scratch has occurred on a fixing belt due to repeated printing of the same sheet size is reused.

In step S13, a controller 19 updates a use history stored in a fixing unit use history storage 17*b* every time an image is formed on a sheet of a certain sheet size and a certain sheet type using the fixing unit 11*a* being attached. The use history is, for example, the number of times the fixing unit 11*a* is used for printing employing a sheet size and a sheet type of the fixing unit 11*a*.

The controller 19 compares the number of times the printing is performed after update and a predetermined threshold number of times. For example, the threshold number of times is determined on the basis of the number of times of printing when scratches occur in the fixing belt by actually performing printing on sheets of the same sheet size and the same sheet type by using a fixing unit of the same type as the fixing unit 11*a* being attached.

As a result of the comparison, the controller 19 displays a message field for showing the following two messages on a display 3 when the number of times printing is performed after update is larger than the threshold number of times. (Message 1) A currently attached fixing unit may not be used for printing on sheets of a currently used sheet size. (Message 2) The currently attached fixing unit is recommended to be used for printing on sheets of a smaller sheet size than a currently used sheet size hereafter.

Figure 14:
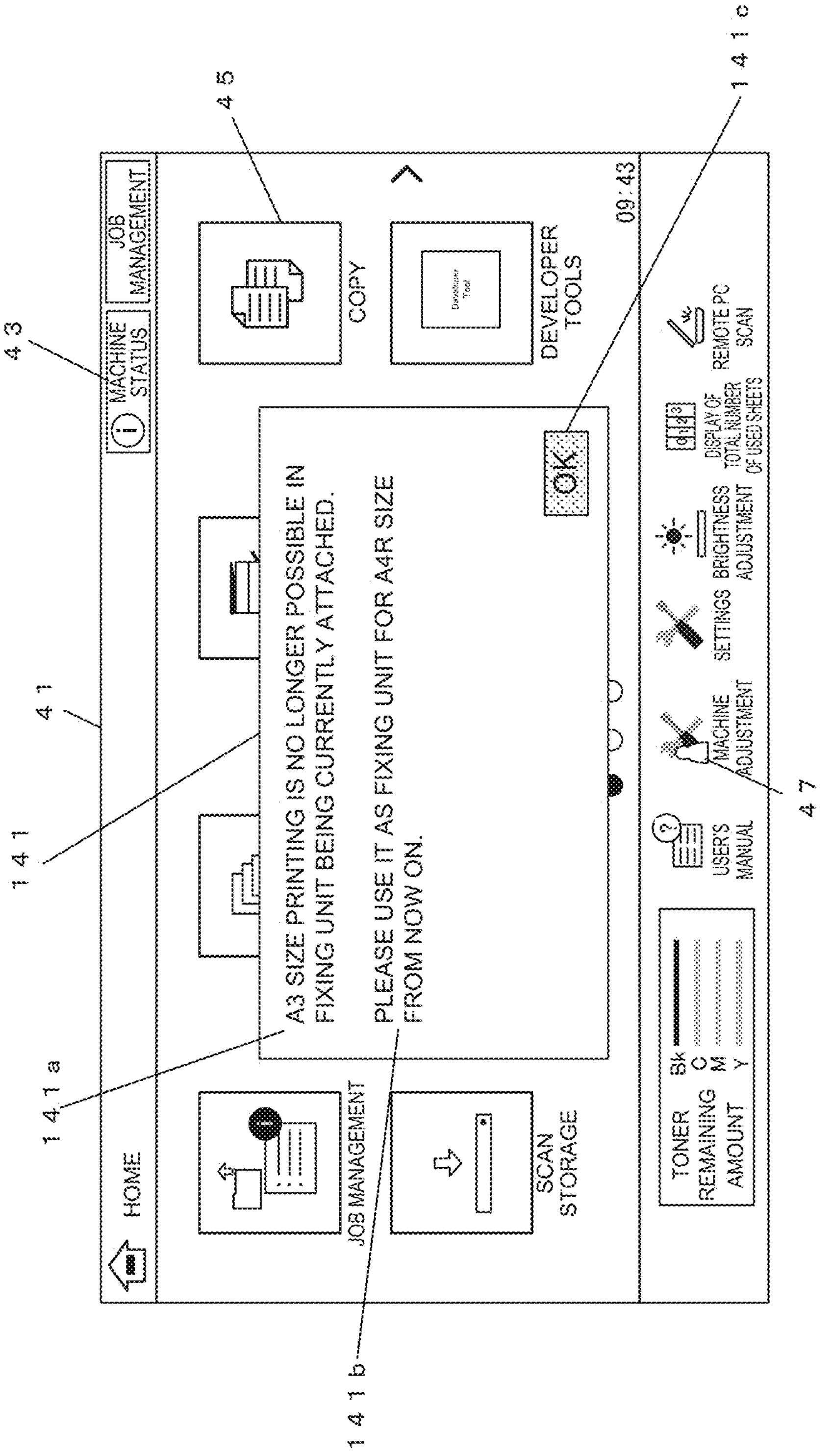
FIG. 14 is a diagram illustrating an example of a home screen displayed on a display of an image forming apparatus according to a third embodiment of the present disclosure.
Figure 15B:
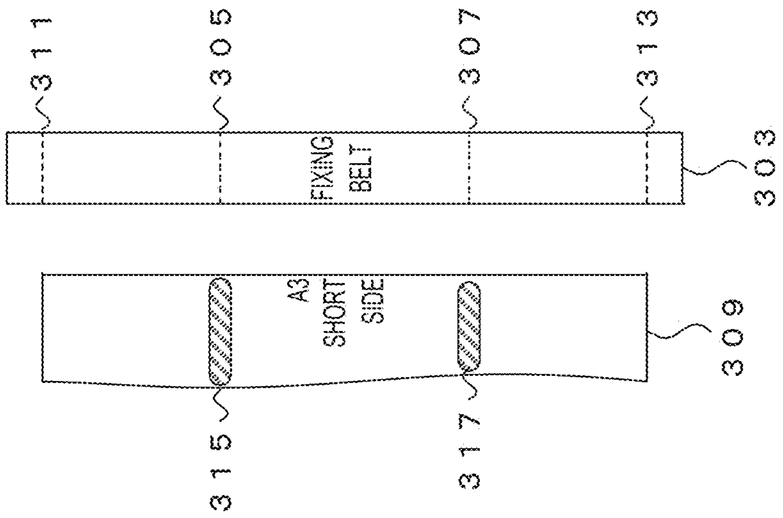
FIG. 15B is a diagram for describing stains generated on an A3 sheet when the sheet passes on the fixing belt having the scratches.
Figure 15A:
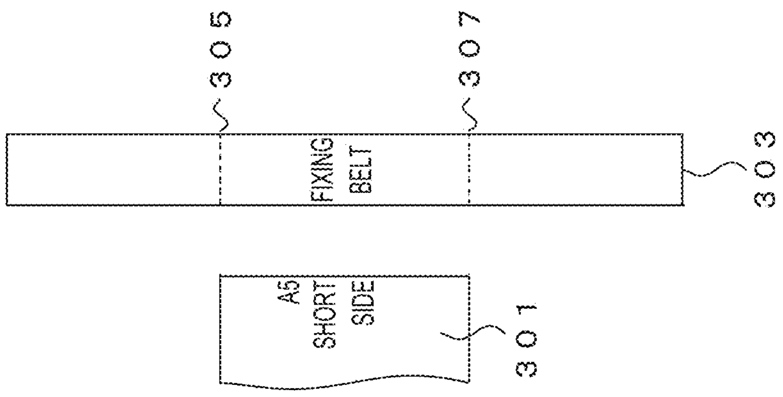
FIG. 15A is a diagram for describing scratches generated on a fixing belt when an A5 sheet passes.

FIG. 14 is a diagram illustrating an example of a home screen displayed on the display 3 of an image forming apparatus 1 according to the third embodiment of the present disclosure. In FIG. 14, a message field 141 is displayed on a home screen 41 in an overlapping manner. The message field 141 includes messages 141*a* and 141*b*, and an OK button 141*c*.

The message 141*a* corresponds to Message 1. The message 141*a* indicates that printing using a currently attached fixing unit 11*a* (fixing unit type of A3 size) may not be used for printing.

The message 141*b* corresponds to Message 2. The message 141*b* prompts the user to use the currently attached fixing unit 11*a* for printing on sheets of A4R (A4 horizontal format) hereafter. When agreeing to this message, the user preferably updates fixing unit information of the currently attached fixing unit 11*a* via the operation acceptor 5, and changes the fixing unit type to an A4 horizontal format. In accordance with this operation, the controller 19 updates the fixing unit information stored in a fixing unit information storage 11*al* of the currently attached fixing unit 11*a* and an attached unit information storage 17*a*.

The OK button 141*c* is a screen element to be operated via an operation acceptor 5. In response to an operation on the OK button 141*c*, the controller 19 performs screen transition to the original home screen 41 without the message field 141 on the display 3.

After the message field 141 is displayed on the display 3, the controller 19 restricts printing using A3 size sheets by the currently attached fixing unit 11*a*. As content of the restriction, printing on A3 size sheets may be simply prohibited. In this case, for example, on a sheet selection screen 81 of FIG. 8, a main body sheet feeding tray display 83*d* and mass sheet feeding tray displays 85*a* to 85*d* which correspond to trays accommodating A3 sheets are displayed in a selection unavailable manner (for example, grayed out display). Furthermore, emphasized display of machine diagram displays 89*d* to 89*h* corresponding to displays of these trays in FIG. 8 is cancelled. Alternatively, when a print instruction using A3 size sheets is input via the operation acceptor 5, the controller 19 may display a message on the display 3 to inform the user that print quality may not be guaranteed due to scratches on a fixing belt, give the user an opportunity to cancel the instruction, and execute the print instruction when the user requests continuation of the instruction.

Note that, although the controller 19 determines whether scratches exist on a surface of the fixing belt by comparing the number of times printing is performed using a fixing unit being attached for printing of a certain sheet size and a certain sheet type with a predetermined threshold number of times in the foregoing embodiment, another determination method may be employed.

For example, when printing is performed in a state in which a surface of the fixing belt of the fixing unit is scratched, stain (black streak) caused by scratches of the fixing belt is attached to a printed sheet. It is considered that the presence or absence of a scratch on the surface of the fixing belt is determined by detecting a black streak. More specifically, when printing is performed on one sheet using an image former 11, the controller 19 acquires an image of a printing surface of the printed sheet using an image inputter 7, and determines whether a black streak is included in an edge portion of the sheet of the image. In this determination, it may be determined that there is a scratch on the surface of the fixing belt in a case where a black streak is detected even once, or it may be determined that there is a scratch on the surface of the fixing belt in a case where a black streak is detected every time a predetermined number of times printing is successively executed.

According to the third embodiment, defect printing in which a black streak is generated on a print surface due to a scratch generated on a surface of a fixing belt can be suppressed or detected immediately after the generation, so that an adverse effect to the printing may be minimized.

Furthermore, according to the third embodiment, the user may be prompted to transfer a fixing unit which becomes unsuitable for printing on sheets of a certain sheet size due to a scratch on a surface of a fixing belt to printing on sheets of a sheet size smaller than the certain sheet size. Accordingly, a period of time in which the fixing unit can be used while printing quality is maintained can be extended.

4. Other Modifications

The present disclosure is not limited to the embodiments and the modifications described above, but is diversely changeable. That is, the technical scope of the present disclosure also includes embodiments obtained by combining technical measures modified as appropriate without departing from the gist of the present disclosure.

The programs, which operate in the respective devices of the embodiments, control a CPU or the like (programs causing a computer to operate) so that functions of the above embodiments may be realized. The information to be handled by these devices is temporarily stored in a temporary storage device (e.g., RAM) during processing the information, and then stored in various storage devices, such as a Read Only Memory (ROM) and an HDD, and is read, corrected, and written by the CPU as needed.

Here, a recording medium for storing the programs may be any of a semiconductor medium (e.g., a ROM or a non-volatile memory card, etc.), an optical recording medium/magneto-optical recording medium (e.g., digital versatile disc (DVD), a magneto optical disc (MO), a mini disc (MD), a compact disc (CD), and a Blu-ray (registered trademark) disc (BD), etc.), and a magnetic recording medium (e.g., a magnetic tape and a flexible disk, etc.). In addition, not only the functions in the above-described embodiments are implemented by executing the loaded program, but also the functions in the present disclosure may be implemented by processing the program jointly with an operating system, other application programs, or the like on the basis of instructions of the programs.

Furthermore, in a case where the programs are to be distributed to the market, the programs may be stored in a portable recording medium for distribution or transferred to a server computer connected via a network, such as the Internet. In this case, needless to say, a storage device of the server computer is also included in the present disclosure.

What is claimed is:

1. An image forming apparatus, comprising:

one or more controllers; and an image former having one or more detachable fixing units, wherein:

the one or more controllers acquire fixing unit information on a fixing unit attached to the image former, and execute a predetermined process, based on the acquired fixing unit information, the fixing unit information comprises identification information for uniquely identifying the fixing unit, and the predetermined process comprises determining a size of sheets, on which image formation using the fixing unit is permitted, based on the identification information, and determining whether to execute image formation on the sheets, using the image former, based on a result of the predetermined process, wherein the one or more controllers:

in a case that the size of sheets is a first size, permit the execution of image formation on sheets of the first size, and restrict the execution of image formation on sheets other than the first size; and in a case that a number of times the image formation has been executed on the sheets of the first size becomes greater than a predetermined number, restrict the execution of image formation on the sheets of the first size, and permit the execution of image formation on sheets of a second size, smaller than the first size.

2. The image forming apparatus according to claim 1, further comprising:

a display, wherein the predetermined process further comprises displaying at least one of the fixing unit information, and information determined based on the fixing unit information, on the display.

3. The image forming apparatus according to claim 1, wherein:

the sheets have a rectangular shape, and the one or more controllers determine whether to execute image formation on the sheets by using a length of a side of the sheets, which is substantially orthogonal to a transport direction of the sheets, as a reference length.

4. The image forming apparatus according to claim 1, further comprising:

a display, wherein the one or more controllers display, on the display, a sheet size on which the image information is permitted and a sheet size on which the image formation is restricted in different display modes.

5. The image forming apparatus according to claim 1, wherein the one or more controllers restrict image formation performed by the image former on sheets of the sheet size on which the image formation is restricted.

6. A method for operating an image forming apparatus comprising an image former having one or more detachable fixing units, the method comprising:

acquiring fixing unit information on a fixing unit attached to the image former, and executing a predetermined process, based on the acquired fixing unit information, wherein:

the fixing unit information comprises identification information for uniquely identifying the fixing unit, and the predetermined process comprises determining a size of sheets, on which image formation using the fixing unit is permitted, based on the identification information, and determining whether to execute image formation on the sheets, using the image former, based on a result of the predetermined process, in a case that the size of sheets is a first size, the execution of image formation is permitted on sheets of the first size, and the execution of image formation is restricted on sheets other than the first size, and in a case that a number of times the image formation has been executed on the sheets of the first size becomes greater than a predetermined number, the execution of image formation is restricted on the sheets of the first size, and the execution of image formation is permitted on sheets of a second size, smaller than the first size.

* * * * *